Patented Sept. 27, 1938

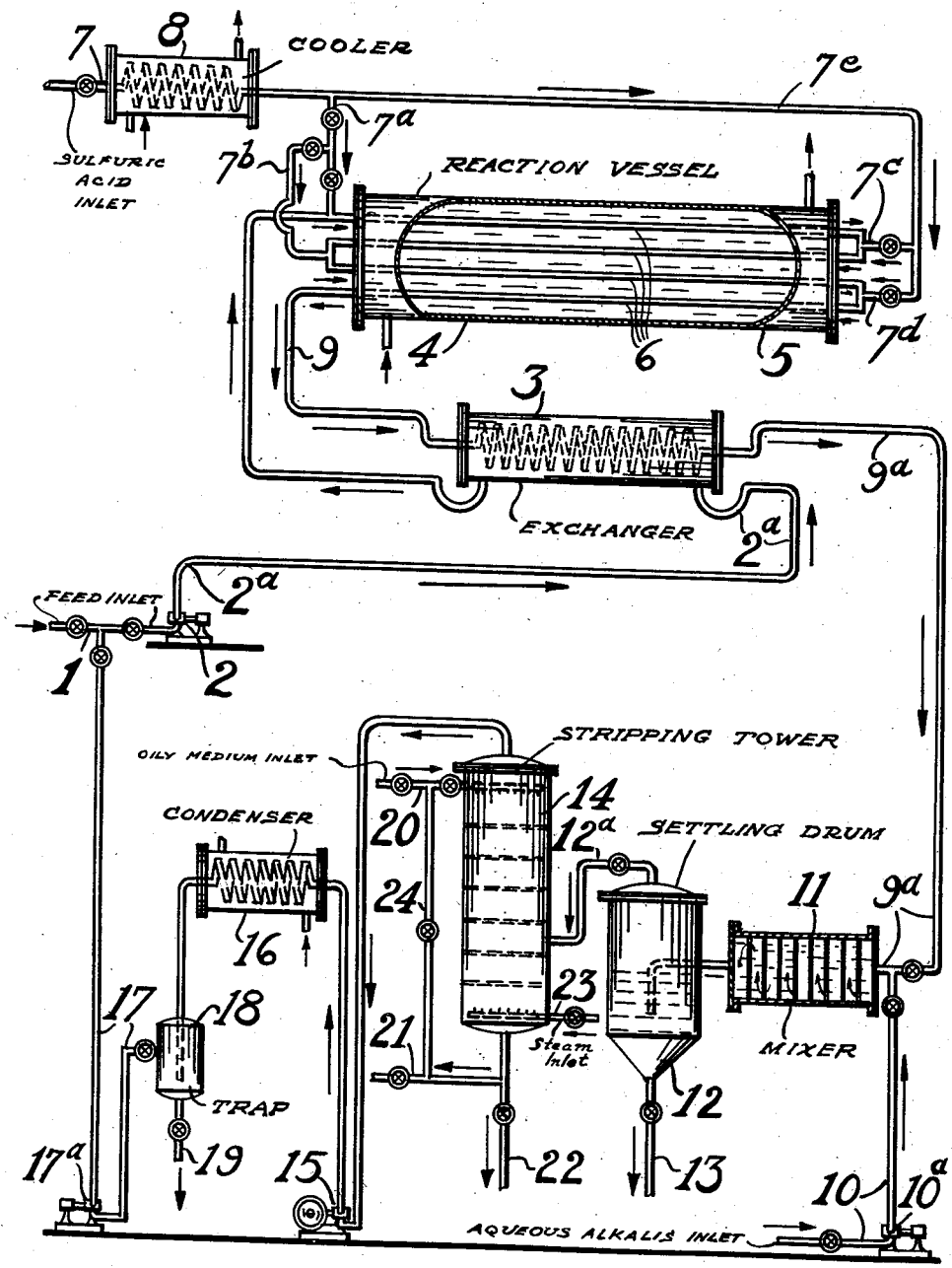

2,131,196

UNITED STATES PATENT OFFICE 2,131,196

POLYMERS AND METHOD OF MAKING THE SAME

Helmuth G. Schneider, Elizabeth, N. J., assignor to Standard Oil Development Company, a corporation of Delaware Application December 8, 1934, Serial No. 756,678

8 Claims. (Cl. 260—2)

The present invention relates to the art of producing valuable polymers from low boiling or gaseous hydrocarbons, and to such polymers themselves and compositions containing the same, and especially to lubricants comprising the polymers either alone or in combination with hydrocarbon oils. The invention will be fully understood from the following description.

The drawing represents in semi-diagrammatic form an apparatus for producing the polymer according to the present invention.

Referring to the drawing, numeral 1 represents a pipe through which the polymerizable material, which will be referred to herein below as isobutylene, is forced either in a pure state or if desired in admixture with a non-polymerizable diluent such as a saturated hydrocarbon, propane or butane or pentane. The material is in a liquefied condition and is forced by pump 2 into pipe 2a through heat exchanger 3 and into a reaction vessel designated generally as 4. This vessel may be of any desired type, the one shown being given merely as a suitable example. It may consist of a shell 5 and narrow reaction tubes 6 connected in series and jacketed by the shell. A refrigerating medium is kept in the shell so as to produce the low temperatures required.

Numeral 7 represents a pipe by which sulphuric acid is forced through a cooler 8 and valved branch pipes 7a, 7b, 7c and 7d are provided to admit the acid from line 7e to the reaction tubes 6 and their ends are so that a small amount of the acid may be added during the flow through the series of connected tubes.

The reaction mixture passes through pipe 9 to exchanger 3 and then by pipe 9a to the recovery system in which the polymer is removed from the diluent, unreacted olefin and catalyst. Aqueous alkali is forced into line 9a by means of line 10 and pump 10a and the entire mixture then passes through a baffled pipe 11 or equivalent mixing device adapted to effect a rapid and complete neutralization. It is preferable to add alcohol or acetone to the aqueous alkali so as to prevent emulsions and to insure rapid and effective settling.

While it is preferred to neutralize the product before separation as outlined above this is not necessary and water or aqueous alcohol or acetone may be added by pipe 10 as indicated. It is then desirable to neutralize the polymer product at a subsequent stage.

From the mixer 11 the product passes to a settling drum 12 and the separation into layers occurs herein. The lower layer contains the aqueous acid or neutralized acid and is removed by pipe 13 and discarded. The oily or polymer layer is removed by pipe 12a to a stripping tower 14 from which the volatile diluent and unreacted or partly reacted olefin is evaporated. Such fractions may be recompressed by pump 15, cooled at 16 and returned to the feed pipe 17 by pump 17a. Condensed steam is collected and removed by trap 18 and pipe 19.

An oily medium may be introduced into tower 14 by line 20 to collect the polymer; a part or all may be added at the top or it may be added to line 12a which conducts the polymer into the tower, or by line 24 to line 21 conducting the product away from the tower. Line 22 allows the removal of the product from the bottom of tower 14 into which heat is supplied through pipe 23.

Many variations may be made in the apparatus, for example a low boiling diluent may be selected, like propane or butane and it may be allowed to evaporate and chill the olefin during polymerization. The separation of polymer from the acid catalyst may also be conducted using a centrifuge to separate the aqueous constituents rapidly from the polymer mixture, either with or without the neutralization step.

The materials to be polymerized comprise the low boiling, preferably normally gaseous olefins and in particular alpha-olefins, such as isobutylene, which is perhaps the best material for this purpose. This particular substance, isobutylene, may be used in a relatively pure state, for example, as obtained by the dehydration of tertiary butyl alcohol, or it may be recovered from cracked vapors and admixed largely with butane and the various hydrocarbons of the same general boiling range.

The suitable catalysts include strong and highly concentrated sulphuric acids, fuming sulphuric acid, and even sulphur trioxide as well as chlor- and other halo sulphonic acids. It is highly desirable to maintain the catalytic material in liquid phase and since the reaction takes place at very low temperatures, a solvent material capable of maintaining the sulphuric acid catalyst in liquid condition even at the lowest polymerization temperatures is included. For this purpose sulphur-containing solvents are to be preferred, among which may be included liquid sulphur dioxide, sulphur halides, particularly the sulphur chlorides such as mono-, di- and tetrachloride and the sulphur oxy-halides, especially those which have melting points well below −20° C. Carbon disulphide may also be used for this purpose. The temperature at which polymerization takes place should be below −20° C. and preferably below −40° or −60° C., and even as low as −80° C. Under such conditions the reaction takes place yielding polymerides of high molecular weight and viscosity far above the well-known dimers, trimers and tetramers. It will be understood that low molecular weight fractions are produced likewise but the important point here is that the heavy polymer fractions are obtained. It is preferable to use low temperatures and to provide adequate provision to rapidly remove heat. The more effective the removal of heat, the better is the quality of the heavy polymer.

The product depends to a considerable extent on the particular olefin polymerized and on the catalyst, and also on the temperature at which the reaction was carried out. Other things being equal, the lower the temperature the higher will be the molecular weight of the particular polymer. These polymers range widely in molecular weight, as indicated above, say from 1,000 to 5,000 or more. As produced, such polymers are mixtures in which the molecular weight varies and the above figures represent average molecular weights. The products in the lower end of the range are thick viscous liquids, tacky, colorless, tasteless and odorless when pure. They are readily soluble in petroleum oils, small amounts greatly increasing the viscosity thereof. The preferred starting materials, particularly isobutylene, produce a polymer which not only greatly increases viscosity but likewise favorably affects the viscosity-temperature curve of the oil to which it is added, causing it to assume a flatter slope, which is, in effect, an increase in viscosity index. The higher polymers produced are plastic, sticky, somewhat elastic materials which are also colorless and odorless, freely soluble in mineral oils, and also greatly increasing the viscosity thereof. All of the present polymers may be decomposed by strong heat and they are characterized by breaking down almost exclusively to gases without production of solid carbonaceous residues.

Examples

I. Isobutylene is polymerized at −36° C. using 2 volume percent (based on the isobutylene) of 20% fuming sulphuric acid as a catalyst, 3 volumes of propane to 1 volume of isobutylene being used. The time of contact was ½ hour. The total crude polymer amounted to 52.1% of the isobutylene and on distillation to 400° F. with steam the lighter fractions were removed leaving a heavier polymer amounting to 10.9% based on the isobutylene. The heavy polymer fraction had the following characteristics:

Specific gravity _____ 0.87°
Viscosity @ 100° F _____ Sec. Saybolt___ 5,464
Viscosity @ 210° F _____ do____ 265.5
Viscosity index_____ 103

II. A second run was made using twice as much catalyst as in Example I, at −80° C. and for 15 minutes. The total crude polymer amounted to 62.3%. The polymer was precipitated from the diluent by adding acetone and the yield of this polymer was 44.3%. The polymer was then steamed to 400° F. removing about 10% so as to obtain a yield of 34%. The properties of the two polymers were as follows:

| | Precipitated with acetone | Steamed to 400° F. |
|---|---|---|
| Specific gravity | 0.88 | 0.88 |
| Viscosity at 100° F | 24,785 | 47,937 |
| Viscosity at 210° F | 852 | 1,485 |
| Viscosity index | 112 | 113 |

III. The heavy fractions of polymers prepared in Examples I and II were added to an S. A. E. 50 lubricating oil. The results were as follows:

| | Viscosity at— | | Viscosity index |
|---|---|---|---|
| | 100° F. | 210° F. | |
| S. A. E. 50 | 308 | 48.2 | 48.5 |
| S. A. E. 50+10% polymer steamed to 400° F. (Example I) | 427 | 53.9 | 54 |
| S. A. E. 50+10% polymer steamed to 400° F. (Example II) | 465 | 56.1 | 63 |

It will be noted that the polymer made at −80° C. was heavy and superior in thickening and viscosity index increasing capacity, to the one prepared at −36° C.

The present invention is not limited to any theory of the polymerization steps nor to any particular raw material, catalyst or catalyst solvent, but only to the following claims in which it is desired to claim all novelty inherent in the invention.

I claim:

1. An improved process for producing valuable high molecular weight polymers comprising maintaining a low molecular weight olefine in liquid phase in intimate contact with a polymerizing catalyst selected from the group consisting of sulphur trioxide and sulphuric, fuming sulphuric, and halo-sulphonic acids at a temperature below −20° C. and separating the catalyst from the resulting polymer.

2. Process according to claim 1, in which the catalyst is maintained in liquid phase by means of an inert solvent therefor.

3. Process according to claim 1, in which the catalyst is maintained in liquid phase by means of a sulphur-containing inert solvent therefor.

4. Process according to claim 1 in which said olefin is a normally gaseous olefin.

5. Process according to claim 1 in which said olefin is a normally gaseous alpha olefin.

6. Process according to claim 1 in which said olefin is isobutylene.

7. An improved process for producing valuable high molecular weight polymers, comprising maintaining a low molecular weight olefin in liquid phrase, in intimate contact with a polymerizing catalyst selected from the group consisting of sulphur trioxide and sulphuric, fuming sulphuric, and halo-sulphonic acids, maintained in liquid phase by means of a solvent selected from the group of liquid sulphur dioxide, sulphur halides, sulphur oxyhalides of low melting points and carbon disulphide, at a temperature below about −20° C. and separating the catalyst from the polymer produced.

8. An improved process for producing valuable high molecular weight polymers of isobutylene, comprising maintaining the olefin in liquid phase in intimate contact with fuming sulphuric acid at a temperature from −20° C. to −80° C. in the presence of liquid sulphur dioxide, capable of maintaining the fuming sulphuric acid in a liquid condition.

HELMUTH G. SCHNEIDER.